UnitedStates Patent [19]

Lin

[11] Patent Number: 4,496,385
[45] Date of Patent: Jan. 29, 1985

[54] APPARATUS FOR PRODUCING A CONTINUOUS GLASS FILAMENT MAT

[75] Inventor: David C. K. Lin, Newark, Ohio

[73] Assignee: Owens-Corning Fiberglas Corporation, Toledo, Ohio

[21] Appl. No.: 520,091

[22] Filed: Aug. 4, 1983

[51] Int. Cl.³ ............................................. C03B 37/06
[52] U.S. Cl. .............................................. 65/9; 65/16
[58] Field of Search ........................... 65/4.4, 5, 9, 16

[56] References Cited

U.S. PATENT DOCUMENTS

| | | | |
|---|---|---|---|
| 2,736,676 | 2/1956 | Frickert | 154/54 |
| 2,859,506 | 11/1958 | Slayter | 28/1 |
| 2,875,503 | 3/1959 | Frickert et al. | 28/1 |
| 3,172,184 | 3/1965 | Salteri et al. | 28/1 |
| 3,442,751 | 5/1969 | Langlois | 156/167 X |
| 3,445,207 | 5/1969 | Goerens | 65/4.4 X |
| 3,511,625 | 5/1970 | Pitt | 65/4.4 |

FOREIGN PATENT DOCUMENTS 508730 7/1952 Belgium ................................. 65/4.4

Primary Examiner—Robert Lindsay
Attorney, Agent, or Firm—Ronald C. Hudgens; Philip R. Cloutier; Greg Dziegielewski

[57] ABSTRACT

A method and apparatus for producing a mat of continuous glass filaments at increased throughput while maintaining desirable tensile strength characteristics by means of an oscillatable, fluidic distribution system.

6 Claims, 8 Drawing Figures

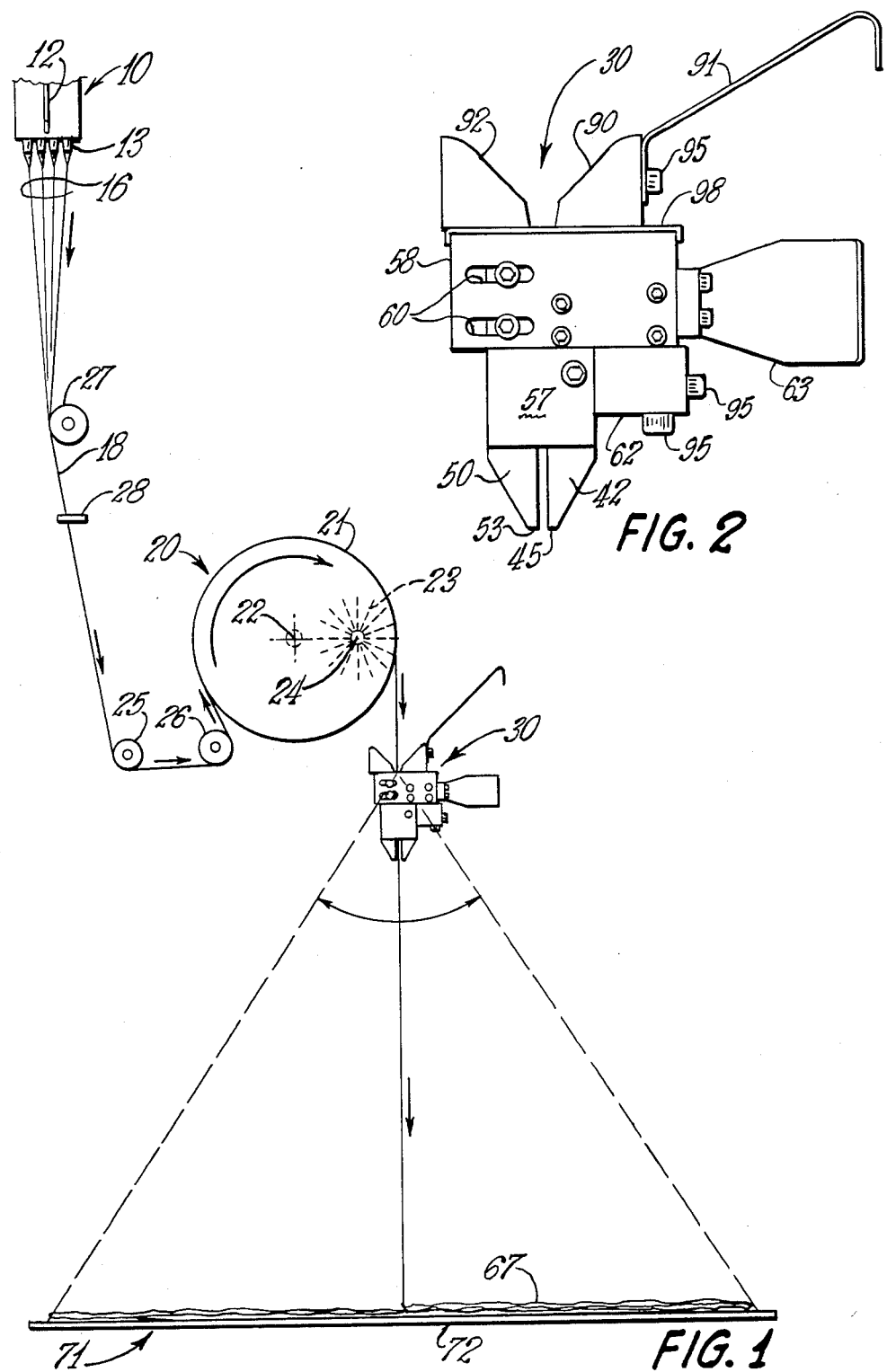

APPARATUS FOR PRODUCING A CONTINUOUS GLASS FILAMENT MAT

TECHNICAL FIELD

The invention disclosed herein relates to the production of mats comprised of strands of continuous glass filaments arranged in an overlapping, interengaging swirled relationship.

BACKGROUND

As with many other processes, the desire to increase the throughput and efficiency of present systems for producing continuous strand mats has been felt. The physical properties of the mat can be greatly affected by increasing the throughput of the feeder, especially in those processes wherein, contemporaneously, continuous glass filaments are produced, gathered into a plurality of bundles and deposited on a moving conveyor as a mat wherein the bundles or strands arranged in a planar array are oscillated back and forth across the width of the conveyor.

For example, by merely increasing the throughput of the fiber forming feeder, the mat produced may have more tensile strength in the cross machine direction as opposed to the machine direction.

The present invention provides a system wherein the throughput of the system can be increased while achieving the desired tensile strength characteristics.

DISCLOSURE OF THE INVENTION

The invention pertains to method and apparatus for forming a mat of continuous glass filaments comprising: drawing streams of molten glass into continuous filaments; orienting said filaments as a substantially planar band of substantially parallel bundles of filaments; contacting said band with a substantially planar gaseous stream; moving said gaseous stream in contact with said bundles through a divergent section and then through a convergent section to reduce the velocity of the gaseous stream and bundles and to impart lateral movement to pre-selected bundles of said filaments to advance said bundles as a diverging planar array having a width at an after-defined collection surface from about 4 to about 18 times the width of the band at the point of initial contact with said gaseous stream; and collecting said filaments as said mat on a continuously advancing collection surface.

BRIEF DESCRIPTION OF THE DRAWINGS

FIG. 1 is an elevational view of a fiber and mat producing system according to the principles of this invention.

FIG. 2 is an enlarged view of the distribution means shown in FIG. 1.

BEST MODE OF CARRYING OUT THE INVENTION

Figure 3:
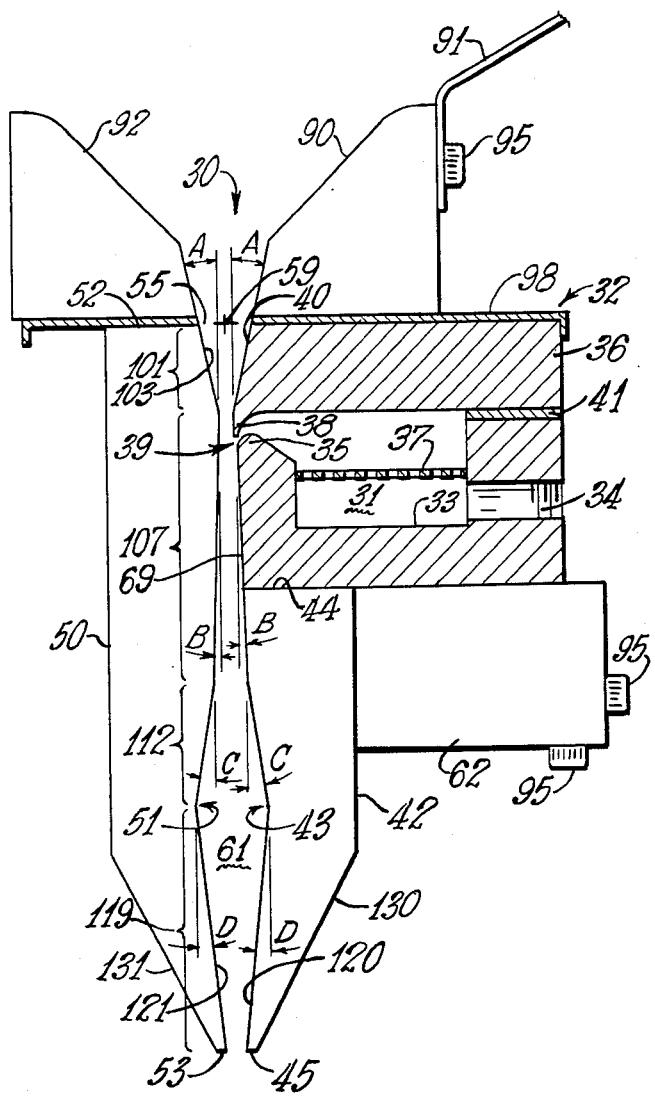
FIG. 3 is an enlarged cross-sectional view of the distribution means shown in FIG. 2.

As shown in FIG. 1, electrically heated feeder means 10 supplies a plurality of streams of molten inorganic material, such as glass, which are attenuated or drawn into a plurality of continuous filaments 16 through the action of attenuation means 20. Feeder 10 may be of any suitable design. As shown, feeder 10 is equipped with a pair of terminals 12 which are connected to a source of electrical energy (not shown). Further, the discharge or bottom wall is equipped with a plurality of orificed projections 13 to supply the streams of molten material, as is known in the art.

Intermediate feeder 10 and attenuation means 20 a coating means 27 supplies a protective coating or size to the advancing filaments. Downstream of size applicator 27, guide or multi-grooved gathering shoe 28 gathers the plurality of filaments into a plurality of strands or bundles having a plurality of filaments in each strand. Preferably, each strand has about the same number of filaments therein. Also, guide 28 orients the strands into a planar band 18 wherein the strands are spaced apart but substantially parallel to each other.

Attenuation means 20 is comprised of a driven pull roll or wheel 21 having an axis of rotation 22, and spaced therefrom, a spoked wheel or carriage 23 having an axis of rotation 24 which is substantially parallel to axis of rotation 22. Spoked wheel 23 is positioned within pull wheel 21, and the extremities of spoked wheel 23 extend through slots in the circumferential periphery of pull wheel 21 to disengage the band 18 from the surface thereof at a predetermined point. As such, the axes of rotation 22 and 24 are fixed. The circumferential surface of pull wheel 21 is substantially flat and is adapted to maintain the band of strands 18 in a substantially spaced apart but parallel relationship. Idler rolls 25 and 26 serve to orient the band 18 as desired. Desirably, roll 25 has a plurality of parallel circumferential grooves to assist in separating the filament into an array of parallel bundles or strands.

Advancing from the surface of pull wheel 21, the band of strands 18 is oscillated across the width of endless foraminous belt 72 of collection means or conveyor 71 to form mat or fibrous body 67 thereon by distribution system 30. As shown in FIG. 1, the axis of rotation 22 is substantially parallel to the path of advancement (perpendicular to the plane of FIG. 1) of belt 72, or in other words, a lateral edge of mat 67.

Usually, a single conveyor 71 will be served by a series of feeders, pull wheels and distribution devices (i.e., plurality of "positions") wherein a plurality of diverging planar arrays of strands are deposited across the width of the conveyor to produce a mat 67 of continuous glass strands and/or filaments arranged in overlapping, interengaging, looping or swirled orientation.

Figure 7:
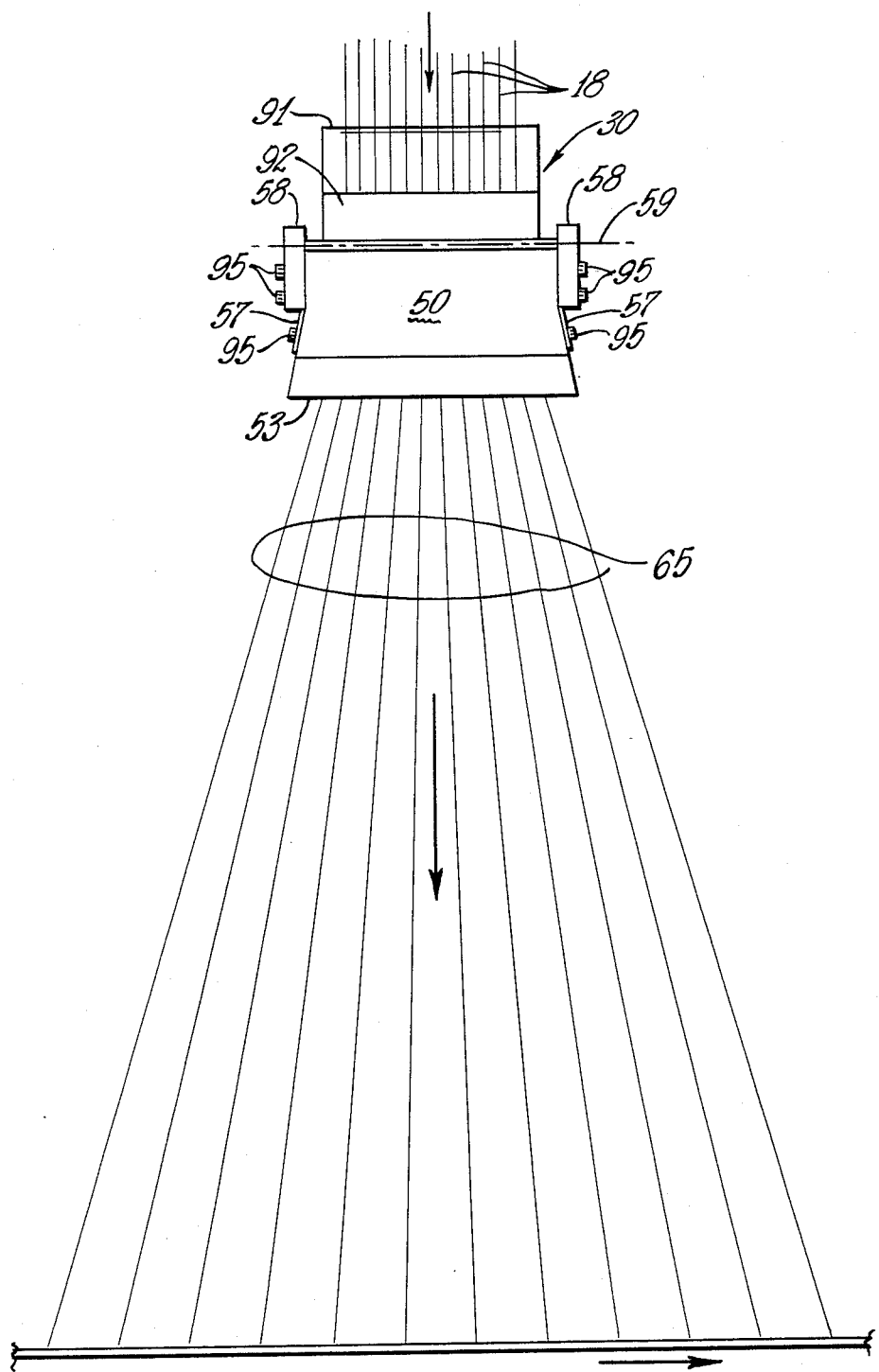
FIG. 7 is an enlarged frontal view of the distribution means shown in FIG. 1.

According to the principles of this invention, distribution means 30 is comprised of blower section 32 and first and second members 42 and 50. Blower section 32 is adapted to provide a substantially uniform planar gaseous stream to contact the band of strands 18 to advance them towards belt 72 in a predetermined manner. First and second members 42 and 50 assist in controlling the gaseous stream such that the planar array of advancing strand 65 advances toward collection means 71 in a diverging relationship as shown in FIG. 7. As the advancing strands contact the conveyor and/or mat surface, buckling of the strands to form the loops therein is achieved.

According to the principles of this invention, a diverging planar array of strands 65 may exhibit a width at the collection surface 72 within the range from about 4 to about 18 times the width of the band of strands 18 entering inlet 55 of distribution means 30. Preferably, the width of the diverging array 65 at collection surface 72 is at least six times the width of band 18 at inlet 55, and, more preferably, the width of diverging array 65 at collection surface 72 is within the range from about 6 to about 10 times the width of band 18.

Such a system has produced an advancing, diverging array 65 having width at collection surface 72 from about 18 inches to about 24 inches from a band 18 having a width at inlet 55 of about 2⅜ inches. Thus, the Loop Formation Ratio (LFR), which will be discussed in more detail later herein, was improved notwithstanding an increase in feeder throughput.

As shown in FIGS. 2 and 3, distribution means 30 is comprised of blower section 32 having a body 33 joined, in part, to first member 42 and cap section 36 which are fastened together by any suitable means such as threaded fasteners. Chamber 31 formed therein may include a foraminous member or screen 37 positioned therein to assist in diffusing the pressurized gas, such as air, supplied through inlet 34 from a suitable source (not shown) to provide a substantially uniform velocity profile along the width of nozzle 39.

Contoured end 35 of body 33 is positioned adjacent contoured lip 38 of cap section 36 to form nozzle portion 39 therebetween to supply the planar, high velocity gaseous stream. Control surfaces 43 and 51 of first and second members 42 and 50, respectively, assist in the control of the working fluid to direct the strands as a diverging planar array according to the principles of this invention. During operation, nozzle portion 39 delivers a substantially planar gaseous stream substantially parallel to the path of advancement of the band of filaments 18 between members 42 and 50 to, among other things, maintain proper tension upon band 18 between distribution means 30 and pull wheel 21.

Control surface 51 is spaced from the contoured lip 38 and control surface 43 to form a control chamber 61. Control chamber 61 is comprised of a slot shaped inlet 55; a tapered inlet section 101; throat section 107; a pre-outlet divergent section 112 and a convergent outlet section 119. Slotted inlet 55 forms one end of tapered inlet section 101 which is in communication with throat section 107, which is in communication with divergent pre-outlet section 112 which, in turn, is communication with convergent outlet section 119. Nozzle portion 39 is in communication with throat section 107 to direct the high velocity planar gaseous stream into contact with the bundles of filaments in throat section 107.

As shown in FIG. 3, front surface 40 of cap 36 and beveled portion of 103 of second member 50 are inclined with respect to an assumed vertical line at an angle "A" to form tapered inlet section 101 of chamber 61. Preferably, angles A are within the range from about 0° to about 20°, thus producing a total included angle range from about 0° to about 40°. As shown in FIG. 3, angles A are approximately 10°, which thus yield a total included angle of about 20°.

First member 42 is fixedly joined to body 33 by means of block 62 and fasteners 95. Control surface 43 of first member 42 is defined by first surface 108, second surface 113 and third surface 120. Control surface 51 of second member 50 is defined by first surface 109, second surface 114 and third surface 121. As shown, second member 50 terminates at distal end 53.

Face 69 of body 33 and first surface 108 of first member 42 form a smooth planar wall opposite first surface 109 of second member 50 to form throat section 107. Face 69, first surface 108 and first surface 109 are, generally, slightly angled to form a slightly divergent throat section. As shown in FIG. 3, face 69, first surface 108 and first surface 109 form angles "B" with respect to an assumed vertical or center line therebetween. Preferably, angles B are within the range from about 0° to about 5° thereby yielding a total included divergent angle of expansion within the range from about 0° to about 10°. As shown, angle B is about 1°.

Pre-outlet, divergent section 112, which is formed in part by second surface 113 of first member 42 and second surface 114 of second member 50, diverge at a total included angle within the range from about 10° to about 40°. That is, second surface 113 and second surface 114 form an angles "C" with an assumed vertical axis or center line therebetween. Preferably, angle C is within the range from about 5° to about 20°. As shown, angle C is about 10°.

Convergent outlet section 119 is formed in part by third surface 120 of first member 42 and third surface 121 of second member 50. Convergent outlet section 119 preferably forms a total included convergent angle within the range from about 10° to about 50°. That is, third surface 120 and third surface 121 form angles "D" with respect to an assumed vertical axis or center line therebetween within the range from about 5° to about 25°. As shown in FIG. 3, angles "D" are about 5°.

To impart the proper amount of lateral movement to the bundles of filaments, the total included angle of divergent section 112 should be greater than the total included angle of the convergent section 119.

Furthermore, the length of throat section 107, that is the distance between tapered inlet section 101 and divergent section 112, is desirably within the range from about 0.25 to about 1.75 times the sum of the lengths of divergent section 112 and convergent section 119 and preferably within the range from about 0.5 to about 0.9 times the sum of the lengths of divergent secion 112 and convergent section 119.

Figure 4:
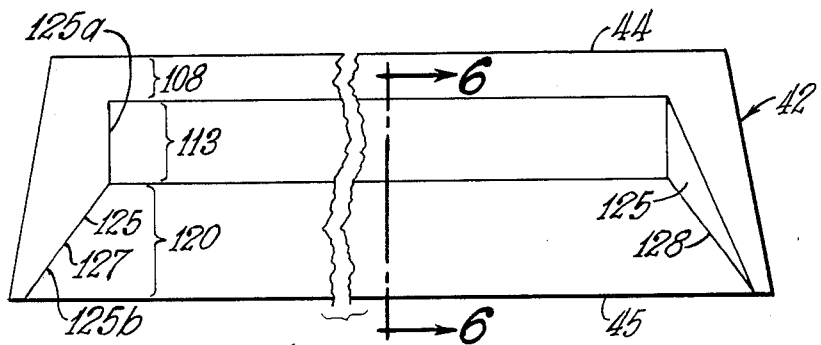
FIG. 4 is an enlarged view of the first control member of the distribution means shown in FIG. 1.

As shown in FIG. 4, control surface 43 of first member 42 is configured such that second surface 113 and third surface 120 form a "shovel-shaped" recess within the plane of first surface 108. Further, it can be seen that the length of third surface 120 at the distal end 44 is greater than the length thereof at the line of abutment with second surface 113. Thus, edges 127 and 128 are angled outwardly to form lateral surfaces 125 in member 42 which also diverge with respect to one another. That is, third surfaces 120 and 121 converge with respect to each other, but lateral surfaces 125 of the recesses formed in first member 42 along second surface 113 and third surface 120 divergent with respect to each other.

FIG. 4 shows two different types of designs for lateral edges 125. The left hand portion of FIG. 4 shows lateral surface 125 without any bevel as is shown in the right hand portion of FIG. 4. As such the lateral surface 125 (left hand portion) is comprised of two surfaces 125a and 125b that are substantially perpendicular to the plane of first surface 108. Alternatively, the right hand portion of FIG. 4 shows lateral surface as a single plane forming straight line intersections with surfaces 108, 113 and 120.

Figure 5:
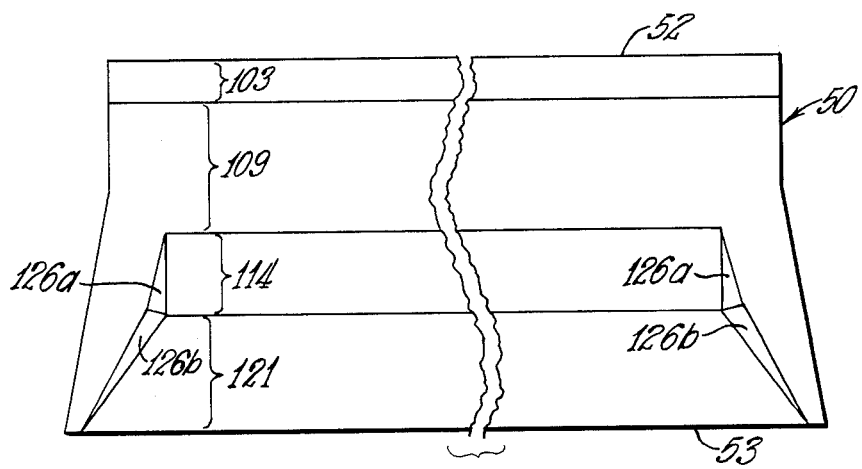
FIG. 5 is an enlarged view of the second control member of the distribution means shown in FIG. 1.

Similarly, as shown in FIG. 5, second surface 114 and third surface 121 form a "shovel-shaped" recess in the plane of first surface 109 of control surface 51 of second member 50. As shown in FIG. 5, second surface 114 terminates at beveled lateral surfaces 126a, and third surface 121 terminates at beveled surfaces 126b. Lateral surfaces 126b are divergent with respect to each other. Further, continuous surface 126a and surface 126b are angled with respect to each other to form a "double-beveled" lateral surface at each end of the divergent and convergent sections. Preferably, the lateral surfaces of control surfaces 43 and 51 are of the "double-beveled" type as shown in FIG. 5 to facilitate in the smooth lateral disbursement of the strands or filaments into the diverging array. Thus, the control surfaces 43 and 51 are configured to direct the gaseous stream laterally outward to impart lateral movement to the strands or bundles of filaments to issue the bundles as a diverging planar array of strands 65.

Figure 6:
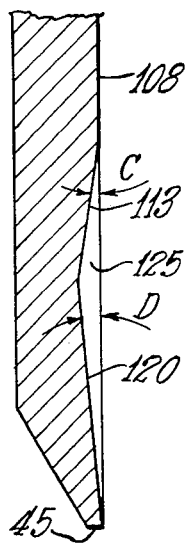
FIG. 6 is an enlarged cross-sectional view taken along section 6—6 of the control member shown in FIG. 4.

The recess formed in first member 42 is also shown in FIG. 6. Preferably, the divergent and convergent sections of control surfaces 51 and 43 are mirror images of each other and each preferably have bi-lateral symmetry as shown in FIG. 5. Preferably, exterior surfaces 130 and 131 of members 42 and 50 are beveled at approximately 60° to permit the smooth induction of ambient air to reduce turbulence at the exit.

The diverging/converging configuration of the control chamber 31 first, reduces the velocity of the gaseous stream exiting from distribution means 30 to permit the distribution means 30 to be placed closer to collection means 71 than would generally be possible without such a configuration and, secondly, imparts lateral movement to the bundles of filament to eject the bundles of filaments from distribution means 30 as a diverging planar array of bundles.

Figure 8:
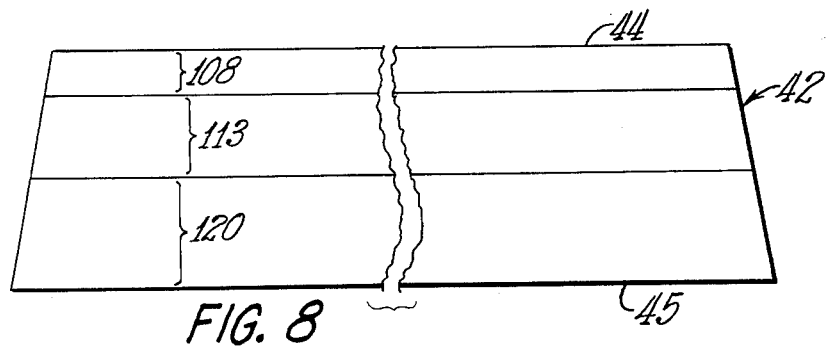
FIG. 8 is an enlarged view of the first control member having an alternative control surface shape.

Alternatively, the divergent and convergent sections of control surfaces 43 and 51 may extend completely across the width of first member 42 and second member 50 as shown in FIG. 8. As such, the junction of first surfaces 108 (or 109) and second surface 113 (or 114) and the junction of second surface 113 (or 114) and third surface 120 (or 121) form a pair of substantially parallel lines. To assist in the control of the stream of air it is desirable, in this case, to provide end plates 57 at the sides of chamber 61 at the ends of first surfaces 108 and 109 and second surfaces 113 and 114 to assist in controlling the lateral disbursement of the filaments and/or strands. Preferably, the ends of third sections 120 and 121 are uncovered to permit maximum lateral expansion of the working fluid and filaments and/or strands.

Also, depending upon, in part, the type of sizing applied to the filaments 16, the individual bundles of filaments may be disassociated in whole or in part to form an array of more, but smaller, bundles or individual filaments, for advancement toward conveyor 71 as a diverging planar array.

Additionally, a first deflector means 90 and a second deflector means 92, are joined at cap section 36 and second member 50, respectively, to assisting guiding band 18 into inlet 55. As shown in FIGS. 2 and 3, plate 98 having a slot conforming to inlet 55 is fastened to first and second deflector means 90 and 92 and cap 36 to locate deflectors 90 and 92 at inlet 55.

Extension 91, which projects laterally and upwardly from first deflector 90, guides "heavy" bundles of strand that may be thrown off pull wheel 21 at too early of a point into inlet 55.

Preferably, distributor means 30 and air supply header 63 which is in communication with inlet 34, is made from lightweight materials, such as aluminum, to reduce the mass of the system that must be reciprocably moved. Coatings may be applied to the strand contacting surfaces to reduce friction and surface wear and filament abrasion, if desired.

Control surfaces 43 and 51 shown are symmetrical about the vertical centerline from side to side in FIG. 5, but such control surfaces, including lateral surfaces 125 and 126, may be asymmetrically arranged, similar to that shown in FIG. 4, to form an asymmetrical, but still diverging, array 65, if desired.

A pair of end plates 57 are fastened to first member 42 and are also in contact with second member 50 by any suitable means, such as threaded fasteners, to further define chamber 31. Mounting plates 58, at each end of unit 30, secure second member 50 to first member 42 to fix the distance therebetween. However, mounting plates 58 include slots 60, to permit adjustment of the space between control surfaces 43 and 51.

Distribution means 30 is pivotable about axis of rotation 59 to direct the gaseous stream and array of strands or filaments back and forth across the width of conveyor belt 72 as shown in FIG. 1. It is preferred that the axis of rotation of the distribution means 30 should be substantially parallel to and in line with the center line of inlet 55 to provide uninterrupted access to distribution means 30 by the band of strands 18 throughout the complete arc of oscillation of distribution means 30. As shown, distribution means 30, which may be driven for movement by any suitable motive means (not shown), is oscillated about an axis substantially parallel to the path of advancement of conveyor belt 72 to distribute the planar array of strands 65 across the width of mat 67. However, it is to be understood that the axis of rotation of distribution means 30 may be obliquely oriented with respect to the path of advancement of belt 72 to produce a mat of different physical characteristics, if desired.

As shown in the drawings, distribution means 30 provides a single planar gaseous stream according to the principles of this invention. However, it is to be understood that a mirror image of blower section 32, cap 36 and first member 42 may be provided in place of second member 50 to provide a distribution means for supplying a pair of opposing, planar gaseous streams having band 18 positioned therebetween.

The pressurized air supplied to chamber 35 should be suitably regulated for proper control. Further, shim 41 may be added between 36 and body 33 to modify the distance between contoured lip 38 and contoured end 44 of nozzle portion 39 to, for example, modify the volume of air flowing through nozzle 39 portion. Preferably, the contours and spacing of lip 38 and end 44 are formed according to the principles set forth in U.S. Pat. No. 4,316,731, issued on Feb. 23, 1982 to Lin, et al, which is hereby incorporated by reference.

As is known in the art, mat 67 may receive a suitable binder to adhere the strands and filaments to one another to form a unitary fibrous body. For example, see U.S. Pat. Nos. 3,442,751 and 2,875,503. Or, mat 67 may be needle punched to provide sufficient integrity, as desired.

The present invention provides a mat of continuous glass filaments having an improved loop formation ratio "LFR" with respect to present commercial continuous strand mat operations.

By definition:

$$LFR = \frac{\text{(Pull Roll Speed) (Mat Weight) (Array Width)}}{2\text{(No. of Positions) (Feeder Throughput)}}$$

Wherein, "pull roll speed" is in feet per minute; "mat weight" is in ounces per square foot; "array width" is in feet; "feeder throughput" is in ounces per minute and the "number of positions" is the number of feeder/pull roll and distribution systems per conveyor.

According to the foregoing parameters, the continuous strand mat will generally have a more uniform tensile strength in the machine and cross machine directions as compared to a mat having a lower loop formation ratio.

Thus, it can be seen that present invention can provide a system for maintaining or even improving the LFR of a mat, even when increased throughput is desired, by simply increasing the "array width" of the strands. For example, a feeder throughput increase of 20% was more than compensated for by providing an array width of approximately 6 times the previous array width, with all the other factors remaining constant.

Other systems for distributing the advancing strands as set forth in concurrently filed U.S. patent application Ser. No. 520,092 filed on Aug. 4, 1983 in the name of Fred S. Coffey, which is hereby incorporated by reference, may be employed.

It is apparent that, within the scope of the present invention, modifications and different arrangements can be made other than as herein disclosed. The present disclosure is merely illustrative with the invention comprehending all variations thereof.

INDUSTRIAL APPLICABILITY

The invention disclosed herein is readily applicable to the glass fiber mat industry.

I claim:

1. Apparatus for producing a mat of continuous glass filaments comprising:

feeder means for supplying a plurality of streams of molten glass;

pull roll means for drawing streams into said filaments, said pull roll having an axis of rotation;

a collection surface for collecting said filaments as said mat;

distribution means having (a) an inlet adapted to receive said plurality of filaments arranged as a substantially planar band, said inlet being oriented substantially parallel to the axis of rotation of the pull roll, (b) a blower section adapted to supply a substantially planar high velocity gaseous stream to contact said filaments, (c) a first control surface extending from said blower section, and (d) a second control surface opposite said first control surface, said first and second control surfaces and said blower section forming (a) a throat section to receive said planar gaseous stream from said blower section; (b) a pre-outlet divergent section extending from said throat section, said divergent section having an angle of divergence within the range from about 10° to about 40°; and (c) a convergent outlet section extending from said diverging section to (i) reduce the velocity of the gaseous stream and advancing filaments and (ii) impart lateral movement to some of the gaseous streams and filaments to advance said filaments as a diverging planar array having a width at said collection surface at least about 4 times the width of the band of filaments entering said inlet; and means for moving said distribution means to deposit the array filaments discharged from distribution means across the width of the mat being formed.

2. The apparatus of claim 1 wherein said divergent section and said convergent outlet section extend completely across said first and second control surfaces.

3. The apparatus of claim 2 wherein said diverging planar array has a width at said collection surface from about 6 to about 10 times the width of the band of filaments entering said inlet.

4. The apparatus of claim 1 wherein the angle of expansion of the throat section is within the range from about 0° to about 10°.

5. The apparatus of claim 1 wherein the angle of convergence of the convergent section is within the range from about 10° to about 50°.

6. The apparatus of claim 5 to wherein the length of the throat section is less than the sum of the lengths of the divergent and convergent sections.

* * * * *